US005668484A

United States Patent [19]
Nomura

[11] Patent Number: 5,668,484
[45] Date of Patent: Sep. 16, 1997

[54] HIGH FREQUENCY CLOCK SIGNAL DISTRIBUTION CIRCUIT WITH REDUCED CLOCK SKEW

[75] Inventor: Masahiro Nomura, Tokyo, Japan

[73] Assignee: NEC Corporation, Tokyo, Japan

[21] Appl. No.: 306,981

[22] Filed: Sep. 16, 1994

[30] Foreign Application Priority Data

Sep. 24, 1993 [JP] Japan .................................. 5-237079

[51] Int. Cl.$^6$ ............................................. H03K 19/01
[52] U.S. Cl. ................................................ 326/93; 326/101
[58] Field of Search .............................. 326/93, 95, 97, 326/98, 101

[56] References Cited

U.S. PATENT DOCUMENTS

| | | | |
|---|---|---|---|
| 4,661,721 | 4/1987 | Ushiku . | |
| 4,812,684 | 3/1989 | Yamagiwa et al. | 326/97 |
| 4,833,677 | 5/1989 | Jarwala et al. | 365/201 |
| 5,109,168 | 4/1992 | Rusu | 326/47 |
| 5,270,592 | 12/1993 | Takahashi et al. | 326/101 |
| 5,396,129 | 3/1995 | Tabira | 326/101 |
| 5,410,491 | 4/1995 | Minami | 364/489 |

FOREIGN PATENT DOCUMENTS

| | | | |
|---|---|---|---|
| 0335697 | 10/1989 | European Pat. Off. . | |
| 0451079 | 10/1991 | European Pat. Off. . | |
| 63-13517 | 1/1988 | Japan | 326/93 |
| 4373160 | 12/1992 | Japan . | |

OTHER PUBLICATIONS

Chen, John Y.; "CMOS Devices and Technology for VLSI", © 1990 by Prentice–Hall, Inc.; pp. 101–102.

Sedra et al.; "Microelectronic Circuits", © 1987 by Holt, Rinehart and Winston, Inc.; pp. 339–342.

Chen, John Y.; "CMOS Devices and Technology for VLSI"; © 1990 by Prentice–Hall, Inc.; pp. 12 and 98.

Chen; "CMOS Devices and Technology for VLSI"; copyright 1990 (no month available) by Prentice–Hall, Inc.; pp. 98–101.

Fisher et al.; "Synchronizing Large VLSI Processor Arrays"; Proc. 10th Ann. Intl. Symp. Comp. Arch.; pp. 54–58; 1983 (no month available).

Hwang; "Advanced Computer Architecture: Parallelism, Scalability, Programmability"; copyright 1993 (no month available) by McGraw–Hill, Inc.; pp. 319 and 453–454.

Lee, et al., "A 400MHz CMOS Packet Transmitter–Receiver Chip", IEEE 1989 Custom Integrated Circuits Conference, 1989, pp.16.8.1–16.8.4.

Nigam, et al., "A Comparative Study of Clock Distribution Approaches for WSI", 1993 Proceedings, 5th Ann IEEE International Conference on Wafer Scale Integration, Jan. 1993, pp. 243–251.

Horowitz, "Clocking Strategies in High Performance Processors", 1992 Symposium on VLSI Circuits Digest of Technical Papers, 1992, pp. 50–53.

F. Minami et al.; "Click Tree Synthesis Based on RC Delay Balancing"; IEEE 1992 Custom Integrated Circuits Conference, pp. 28.3.1–28.3.4.

ISSCC 92 Session 6/Microprocessors/Paper TA 6.2; 1992 IEEE International Solid–State Circuits Conference, Digest of Technical Papers, pp. 106–107.

*Primary Examiner*—Edward P. Westin
*Assistant Examiner*—Benjamin D. Driscoll
*Attorney, Agent, or Firm*—Whitham, Curthis, Whitham & McGinn

[57] ABSTRACT

A clock signal distribution circuit of a tree structure having a plurality of buffers arranged in a plurality of hierarchical stages includes short-circuit wirings for short-circuiting output terminals of the buffers at each stage of the plurality of hierarchical stages. Each of the plurality of buffers is formed by a single inverter or a multi-stage inverter wherein an input stage inverter and an output stage inverter are connected in series. The output stage inverter has a size larger than that of the input stage inverter. The clock signal distribution circuit thus constructed can reduce clock skew and distribute a high frequency clock signal having sharp rise and fall characteristics to a plurality of registers.

11 Claims, 5 Drawing Sheets

HIGH FREQUENCY CLOCK SIGNAL DISTRIBUTION CIRCUIT WITH REDUCED CLOCK SKEW

BACKGROUND OF THE INVENTION

1. Field of the Invention

This invention relates to a clock signal distribution circuit that can distribute a high frequency clock signal to a plurality of registers.

2. Description of the Related Art

To distribute a high frequency clock signal, the reduction of clock skew and the increase of a driving capability have previously been attempted. Several methods of clock distribution have been known, such as follows:

The first example is a tree structure driving method represented by an H-Tree structure (for example, as disclosed in "IEEE 1992 CUSTOM INTEGRATED CIRCUITS CONFERENCE", 28.3.1–28.3.4) in which it is possible to achieve a reduced clock skew by equalization of loads and an increased driving capability by a hierarchical arrangement of buffers.

The second example is a large driver packaged driving method (for example, as disclosed in "IEEE 1992 INTERNATIONAL SOLID STATE CIRCUITS CONFERENCE", TA 6.2, pp. 106–107) in which it is possible to achieve the reduced skew by reducing a wire delay time by means of a low resistance clock trunk line design, and to increase a driving capability by means of a large driver. An inverter having a simple structure and a large driving capability is utilized as a buffer of the tree structure driving method. To attain a large driving capability, the size of an inverter is increased, and the number of branches in the tree structure is reduced. A hierarchical structure made up of a number of inverters is utilized as a driver of the large driver packaged driving method.

Moreover, as the third example of techniques for reducing clock skew in the tree structure driving method, as disclosed in Japanese Patent Application Kokai Publication No. Hei-4(1992)-373160, short-circuiting of buffer output terminals at the final stage of a distribution circuit is also known. FIG. 1 shows such a conventional clock signal distribution circuit wherein the buffers of the final stage are mutually connected or short-circuited with each other. More specifically, this circuit is formed by a buffer 401 of a first stage, buffers 402–405 of a second stage, and buffers 411–414, 421–424, 431–434 and 441–444 of a third stage, and output terminals of all the third stage buffers 411–444 are short-circuited by a plurality of short-circuit wirings 471–494.

However, the above mentioned conventional clock signal distribution circuits according to these methods have the following drawbacks.

Specifically, it is, in principle, impossible for the large driver packaged driving method to realize zero skew because there is a difference in distance from a driver to each register. On the other hand, it is theoretically possible for the tree structure driving method to realize zero skew by making a design in such a way that a buffer load of each stage is perfectly equalized. However, in effect, it is difficult for this method to realize zero skew because of changes in parasitic components of a clock signal line and changes in a buffer driving capability due to various restrictions on a clock signal wiring design (such as an area and a design period) and process variations. In the case of the reduction of skew by damping or canceling the generated skews by means of short-circuiting of buffer output terminals at the final stage of a distribution circuit in the tree structure driving method, the larger the skew caused before the final stage, the smaller the skew damping effect becomes, because of parasitic components of a short-circuit wire. In addition, when a large skew ranging to a half cycle of a clock signal is caused, a signal waveform is destroyed. Therefore, it is difficult to realize the reduction of skew which becomes more important when a clock frequency is increased.

The development of a microminiaturization technique and the extension of the length of a clock signal wire result in increased wire resistance, and this in turn deteriorates the sharpness of the rise and fall characteristics that are needed for distributing a high frequency clock signal. The maximum waveform sharpness effect will be reached even if a driving capability is increased by enlarging the size of a single inverter which acts as a buffer of the tree structure. Moreover, an increase in wire resistance as a result of microminiaturization results in the maximum waveform sharpness effect being reached earlier. Even when a driving capability is increased by the reduction of a load at each buffer stage which is achieved by reducing the number of branches in the tree structure, the number of buffers constituting the tree structure is increased. The buffers are arranged with allowance for equalization of loads, and hence the design of the clock signal distribution circuit becomes very complex. Also, it becomes more difficult to attain the equalization of loads.

SUMMARY OF THE INVENTION

In view of the foregoing observations, the primary object of the present invention is to provide a high frequency clock signal distribution circuit in which clock skew is efficiently reduced.

Another object of the present invention is to provide a high frequency clock signal distribution circuit having a large driving capability.

According to one aspect of the invention, there is provided a clock signal distribution circuit of a tree structure, the distribution circuit comprising:

a plurality of buffers arranged in a plurality of hierarchical stages; and short-circuit wirings for short-circuiting output terminals of the buffers at each stage of the plurality of hierarchical stages.

In this invention, output terminals on the same hierarchical level are mutually short-circuited on several levels at each buffer stage, or at intervals of several buffer stages, constituting the tree structure on several levels. It is possible to reduce a phase difference (skew) between two signals by short-circuiting the two signals. The smaller the original skew is, the larger this reducing effect is. Skew caused at each stage or at several stages is sufficiently small, and hence the skew thus caused can be effectively reduced every time short-circuiting occurs.

According to another aspect of the invention, there is provided a clock signal distribution circuit of a tree structure having a plurality of buffers arranged in a plurality of hierarchical stages, each of the plurality of buffers comprising:

an input stage inverter; and an output stage inverter connected in series to said input stage inverter, the output stage inverter being formed by a transistor larger in size than that of the input stage inverter so that each of the plurality of buffers has a low output on-resistance and a small input capacitance.

In this invention, an inverter having a multi-stage configuration is used as a buffer constituting the tree structure. For each buffer, an inverter at a top or input stage is made small and an inverter at the final or output stage is made large so that an input capacitance and an output on-resistance of the buffer may become small. This makes it possible to reduce an output resistance, and a capacitance to be charged and discharged via wire resistance. Therefore, when the wire resistance is particularly large, and when a resistance value roughly equals an output resistance, it is possible to solve the problem in which the maximum effect of improving a driving capability is reached by an increase in the size of an inverter when a single inverter is used as a buffer. When the buffer is made up of a multi-stage inverter having a plurality of single inverters, the absolute delay of the clock distribution circuit increases. However, matching of phases of a clock signal inputted into each register is especially important in the distribution of a clock signal, and hence an increase in the absolute delay of the clock distribution circuit does not matter.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the present invention will be explained hereunder with reference to FIGS. 2–4.

Figure 2A:
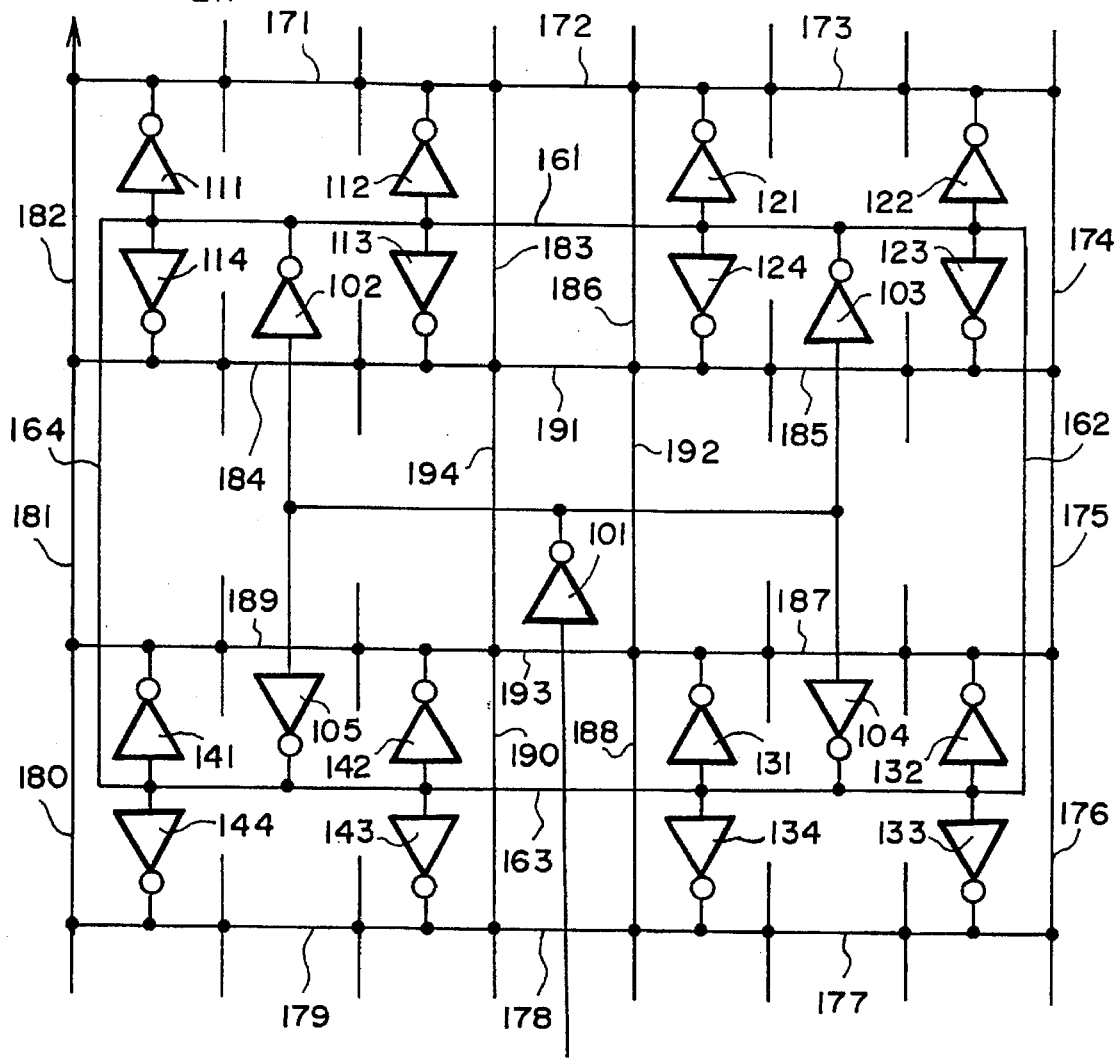
FIG. 2A is a block diagram showing a clock signal distribution circuit according to a first embodiment of the present invention.
Figure 2B:
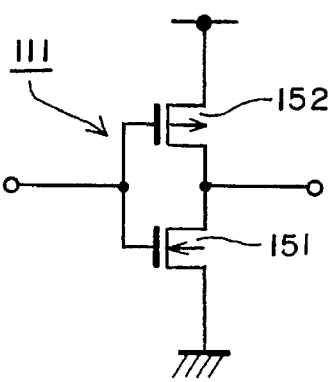
FIG. 2B is a detailed diagram showing one inverter used in the circuit shown in FIG. 2A.

FIG. 2A is a block diagram showing a clock signal distribution circuit according to a first embodiment of the present invention. The circuit comprises a buffer 101 of a first stage, four buffers 102–105 of a second stage, and sixteen buffers grouped into four groups 111–114, 121–124, 131–134 and 141–144 of a third stage, thereby forming the H-Tree structure. Each buffer in this embodiment is constituted by a single inverter. The single inverter 111, taken as an example, can be formed by a pair of opposite mode MOS field effect transistors, i.e., a P-channel MOSFET 152 and an N-channel MOSFET 151 connected in series between a power source and ground as shown in FIG. 2B. Output terminals of the second stage buffers 102, 103, 104 and 105 are short-circuited by short-circuit wirings 161, 162, 163 and 164. In the same manner, the third stage buffers 111–114, 121–124, 131–134 and 141–144 are short-circuited by short-circuit wirings 171–194. As a clock distribution load is equalized by the H-Tree structure and, as mentioned above, the output terminals of the second and third stage buffers are short-circuited at each stage, the clock skew caused at each stage is small and thus it is possible to efficiently reduce the generated skew by short-circuiting.

Figure 3A:
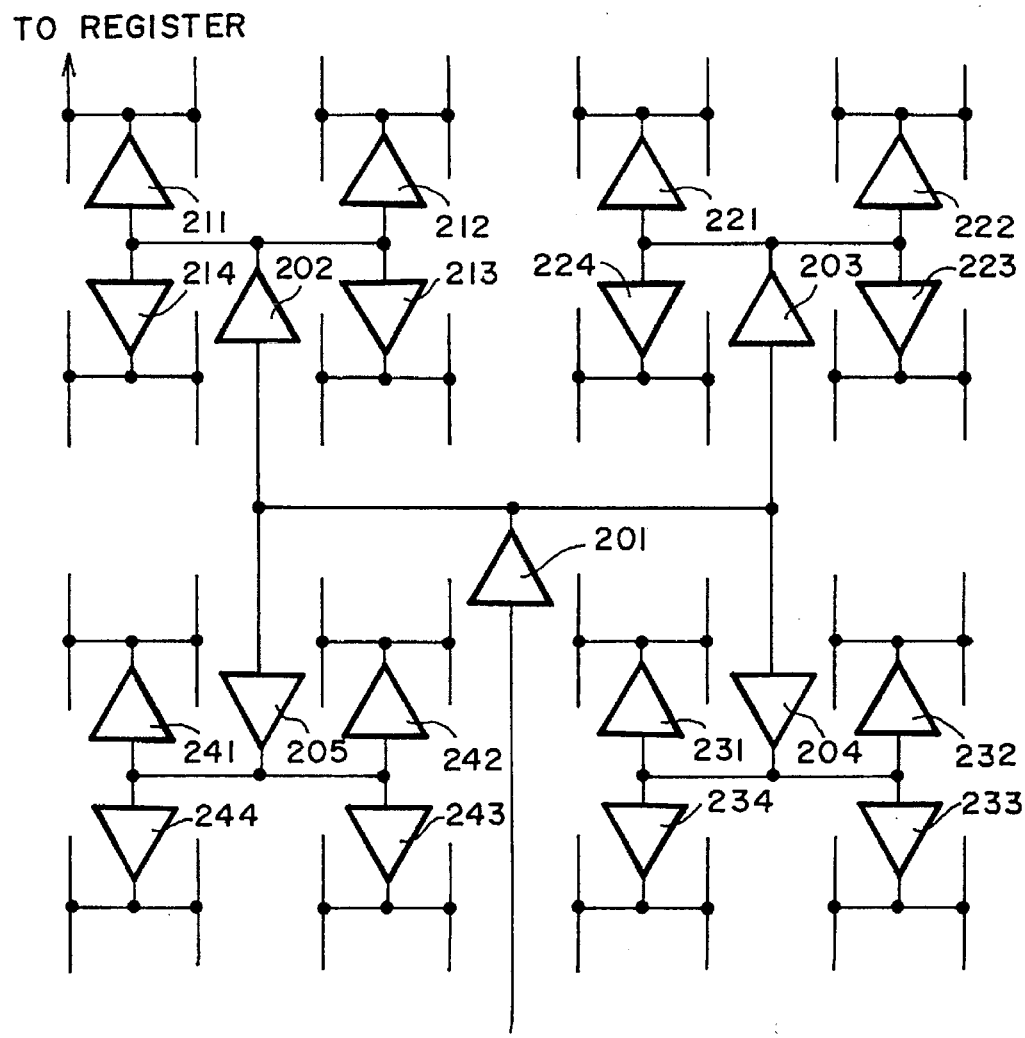
FIG. 3A is a block diagram showing a clock signal distribution circuit according to a second embodiment of the present invention.
Figure 3B:
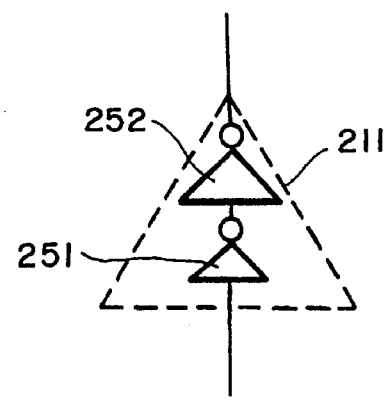
FIG. 3B is a detailed diagram showing one buffer used in the circuit shown in FIG. 2A.

FIG. 3A is a block diagram showing a clock signal distribution circuit according to a second embodiment of the present invention. The circuit comprises a buffer 201 of a first stage, four buffers 202–205 of a second stage, and sixteen buffers 211–214, 221–224, 231–234 and 241–244 of a third stage. In this embodiment, each of the above buffers constituting the H-Tree structure is formed by two-stage inverters. The buffer 211, taken as an example, is formed by an inverter 251 at an input stage and an inverter 252 at an output stage as shown in FIG. 3B. The size of the output stage inverter 252 is set "n" times as large as that of the input stage inverter 251. If MOS transistors are used as an inverter, the channel width of each MOS transistor at the output stage is set "n" times as large as that of each MOS transistor at the input stage. In comparison with a buffer configuration made of a single inverter which is "n" times as large as that of the inverter at the input stage of the two-stage inverter, an input capacitance of a buffer on the subsequent stage can be reduced to 1/n that of a buffer on the previous stage. Thus, this clock signal distribution circuit is effective in sharpening a clock signal even when wire resistance becomes large as a result of microminiaturization and the extension of the length of a clock signal line.

Figure 4A:
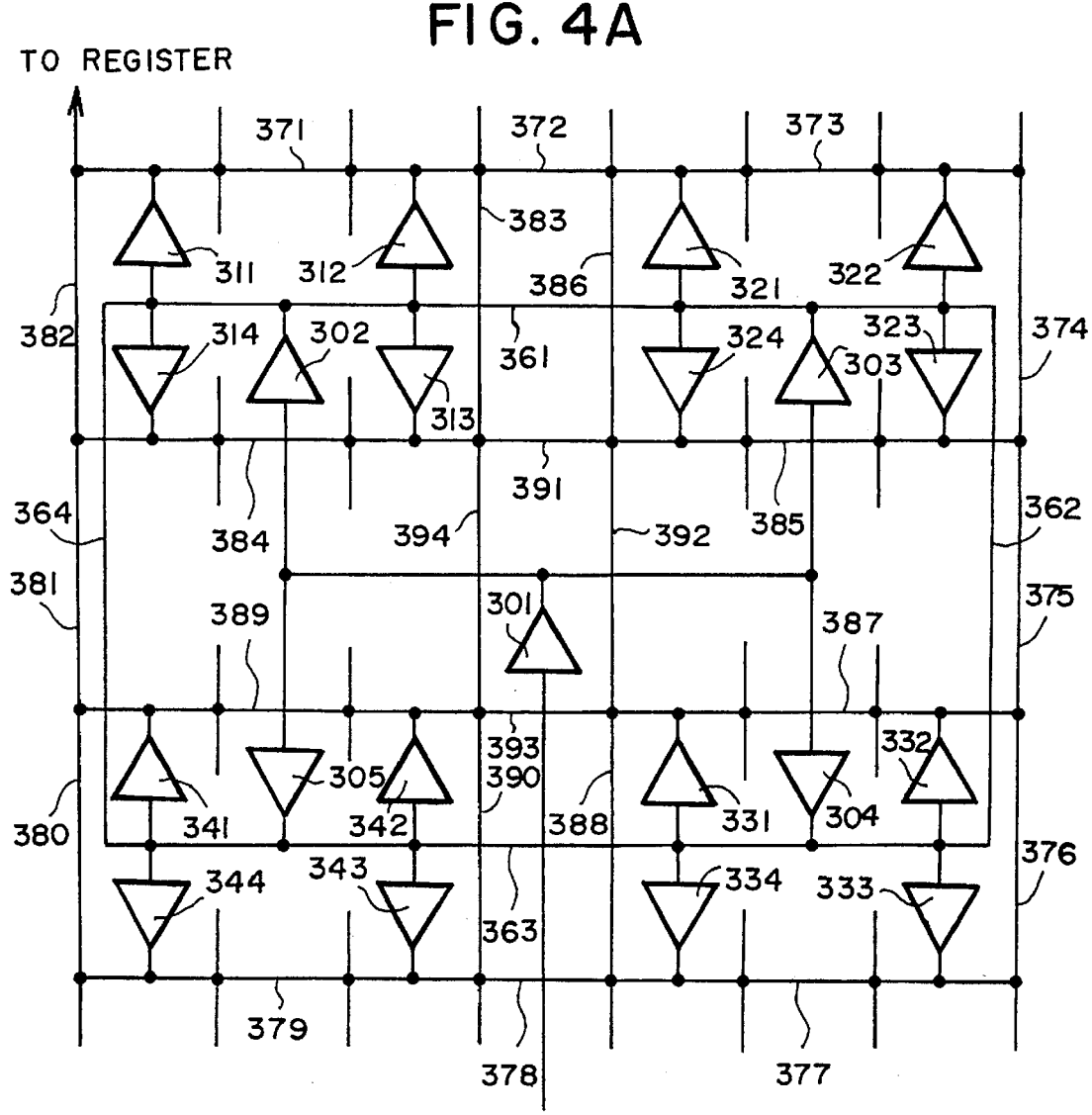
FIG. 4A is a block diagram showing a clock signal distribution circuit according to a third embodiment of the present invention.
Figure 4B:
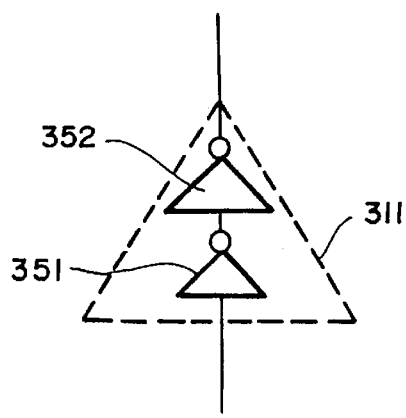
FIG. 4B is a detailed diagram showing one buffer used in the circuit shown in FIG. 4A.

FIG. 4A is a block diagram showing a clock signal distribution circuit according to a third embodiment of the present invention. In this embodiment, each of buffers 301 of the first stage, 302–305 of the second stage, and 311–314, 321–324, 331–334 and 341–344 of the third stage, constituting as a whole the H-Tree structure, is made up of a two-stage inverter. The buffer 311, taken as an example, is formed by an input stage inverter 351 and an output stage inverter 352 as shown in FIG. 4B. Moreover, in this embodiment, output terminals of the second stage buffers 302–305 are short-circuited by short-circuit wirings 361–364 and output terminals of the third stage buffers 311–314, 321–324, 331–334 and 341–344 are short-circuited by short-circuit wirings 371–394, respectively. In each buffer, the size of the output stage inverter is set "n" times as large as that of the input stage inverter. Accordingly, an input capacitance of a buffer at the subsequent stage can be reduced to 1/n that of a buffer at the previous stage when compared with the buffer structure made of a single inverter which is "n" times as large as that of the inverter at the input stage in the two-stage inverter. As a result, this clock signal distribution circuit is effective in sharpening a clock signal even when wire resistance becomes large as a result of microminiaturization and the extension of the length of a clock signal line. A clock distribution load is equalized by the H-Tree structure, and the output terminals of the buffers are short-circuited at each stage. Hence, the skew caused at each stage is small, and it is possible to efficiently reduce the generated skew by short-circuiting. Particularly, when the buffer is made up of inverters arranged in several stages, it may be considered that the level of the tree structure becomes deep, and hence the amount of skew caused by process variations becomes large. However, the reduction of skew by short-circuiting at each buffer stage is effective even in this situation. The sharpening of a clock signal and the reduction of skew allow the distribution of a high frequency clock signal.

Figure 1:
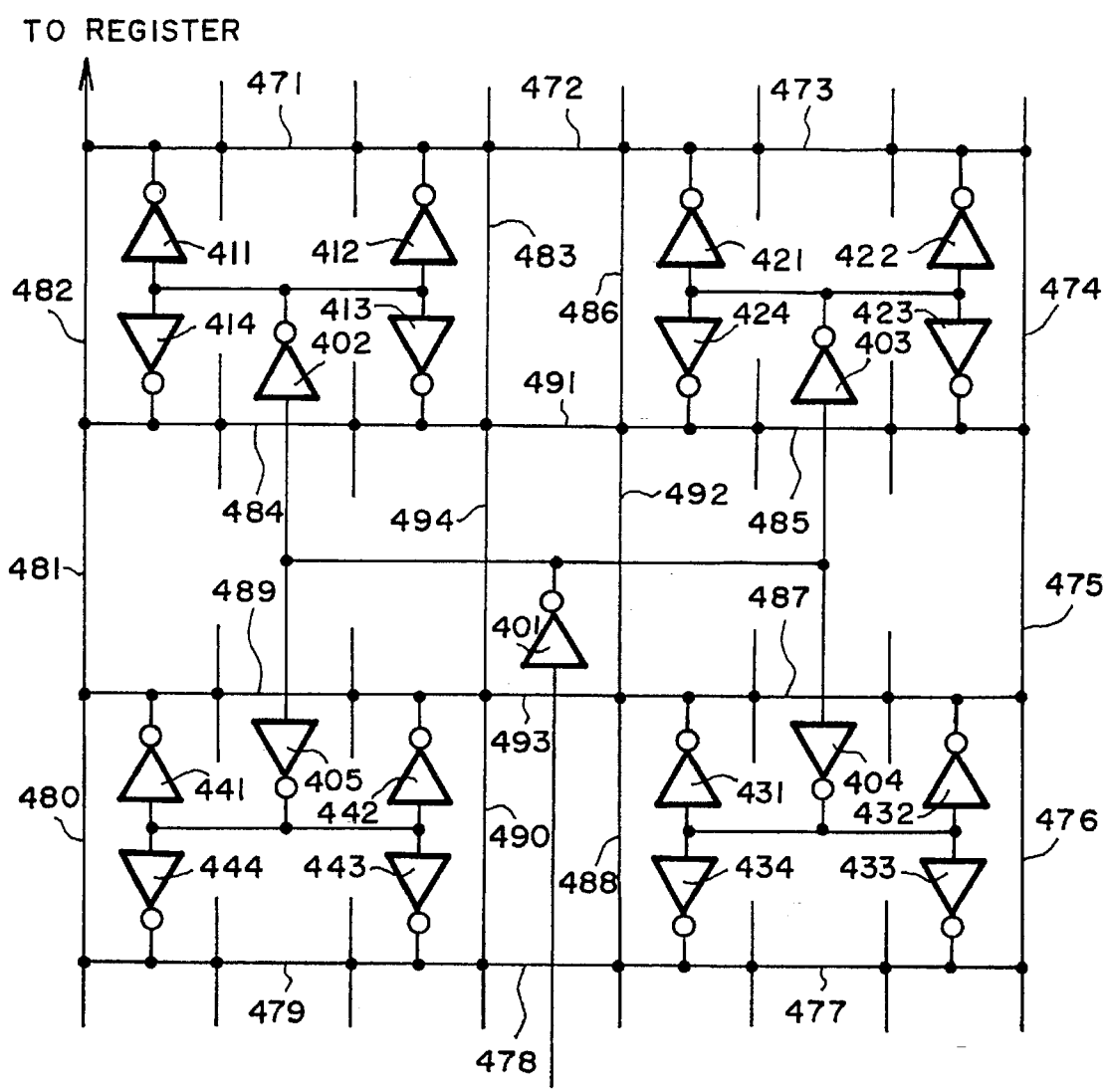
FIG. 1 is a block diagram showing one example of a conventional clock signal distribution circuit.

A difference in effects between a clock signal distribution circuit of the present invention and a conventional clock signal distribution circuit will be described in detail hereunder. A clock skew reducing effect is first estimated using the clock signal distribution circuit of the present invention (shown in FIG. 4) and the conventional clock signal distribution circuit (shown in FIG. 1). Assuming that the clock skew caused per one buffer stage is "t", that skew caused by up to 2t can be reduced to 30% by short-circuiting, and that skew caused by more than 2t can be reduced to 60% by short-circuiting, the clock skew will be reduced to 0.3{0.3 (0.3t+t)+t}=0.417t according to the present invention, whilst the clock skew will be reduced to 0.6(0.3t+2t)=1.38t according to the conventional circuit. Although a much greater number of short-circuit wirings are required in the clock signal distribution circuit of the present invention, it is possible to expect a skew reducing effect three or more times as large as that obtained by the conventional clock signal distribution circuit.

Figure 5:
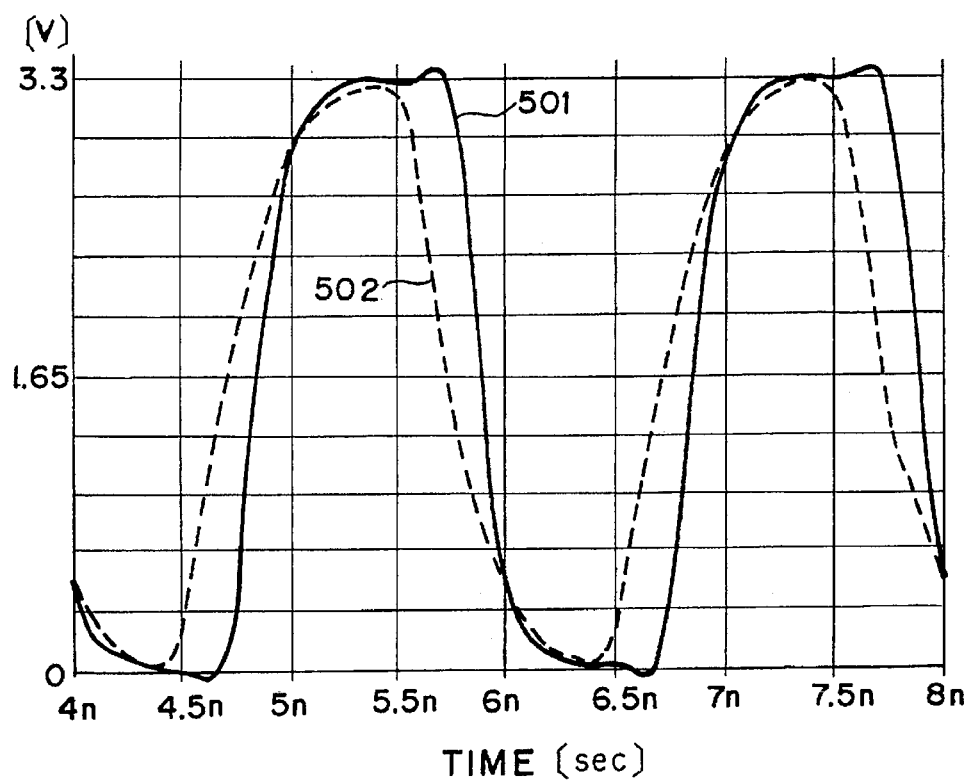
FIG. 5 is a graph showing the comparison of a clock signal waveform obtained by the present invention with a clock signal waveform obtained by the conventional clock signal distribution circuit.

A clock signal sharpening effect is also estimated. FIG. 5 shows a graph of the comparison of a clock signal waveform obtained by the clock signal distribution circuit of the present invention with a clock signal waveform obtained by the conventional clock signal distribution circuit when "n"= 4. Reference numeral 501 designates a clock signal waveform obtained by the clock signal distribution circuit of the invention shown in FIG. 4, and reference numeral 502 designates a clock signal waveform obtained by the conventional clock signal distribution circuit shown in FIG. 1. As can be readily understood from this graph, it can be ascertained that the sharpening of the clock signal waveform can be realized by the circuit of the present invention.

Figure 6A:
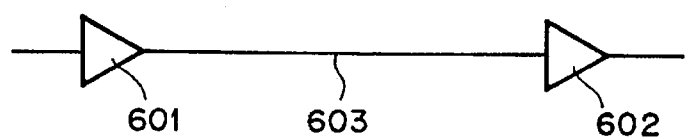
FIG. 6A is a diagram showing a relationship between a buffer and another buffer on the subsequent stage connected via a wire.
Figure 6B:
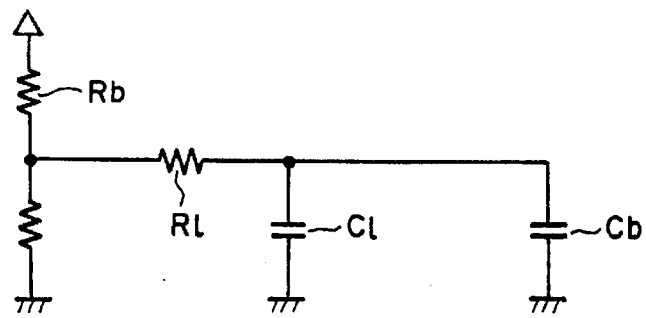
FIG. 6B is an equivalent circuit diagram of the circuit shown in FIG. 6A.

As can be understood from FIG. 6A and its equivalent circuit diagram in FIG. 6B, conventionally, simply increasing the sizes of buffers 601 and 602 with larger inverters cannot sharpen waveforms as shown by the dashed line in FIG. 5. This is because while a larger inverters may have a reduced output resistance Rb, larger inverters also have an increased input capacitance Cb. Thus, any benefit gained by a reduced output resistance in buffer 601 will be negated by the larger input capacitance of the next buffer 602. When the parasitic resistance R1 of the wire 603 becomes a resistance value which is almost the same as the output resistance Rb of the buffer, an increase in the input capacitance Cb will surpass a reduction in the output resistance Rb.

As can be understood from FIG. 6A and its equivalent circuit diagram in FIG. 6B, conventionally, simply increasing the sizes of buffers 601 and 602 with larger inverters cannot sharpen waveforms as shown by the dashed line in FIG. 5. This is because while a larger inverters may have a reduced output resistance Rb, larger inverters also have an increased input capacitance Cb. Thus, any benefit gained by a reduced output resistance in buffer 601 will be negated by the larger input capacitance of the next buffer 602. Hence, a mere increase in the size of an inverter will not contribute to the sharpening of a signal waveform. However, the clock signal distribution circuit of the present invention makes it possible to reduce the input capacitance Cb only, and hence this is effective in sharpening a signal waveform.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. A clock signal distribution circuit having an H-tree structure, said distribution circuit comprising:
    a plurality of buffers arranged in a plurality of hierarchical stages, in an H-tree structure;
    and short-circuit wirings for short circuiting output terminals of said buffers at each stage of said plurality of hierarchical stages.

2. The clock signal distribution circuit of a tree structure according to claim 1, wherein each of said plurality of buffers comprises a single inverter.

3. The clock signal distribution circuit of a tree structure according to claim 2, wherein said single inverter includes a P-channel MOS field effect transistor and an N-channel MOS field effect transistor connected in series between a power supply source and ground.

4. A clock signal distribution circuit having an H-tree structure wherein a plurality of buffers are arranged in a plurality of hierarchical stages with the same load and the same wiring length, said clock signal distribution circuit comprising:
    a combination of an input stage inverter and an output stage inverter comprising each of said plurality of buffers, said output stage inverter being connected in series to said input stage inverter and formed by a transistor larger in size than that of said input stage inverter so that each of said plurality of buffers has a low output on-resistance and a small input capacitance; and
    a short-circuit wiring for short-circuiting output terminals of said buffers at each stage of said plurality of hierarchical stages in said H-tree structure.

5. The clock signal distribution circuit of a tree structure according to claim 4, wherein each of said input and output stage inverters are formed by a pair of opposite mode MOS field effect transistors, each of said MOS field effect transistors of said output stage inverter having a channel width larger than that of each of said MOS field effect transistors of said input stage inverter.

6. A clock signal distribution circuit of a tree structure, having a plurality of hierarchical stages, each of said hierarchical stages comprising:
    n buffers, where n is an integer from 1 to N, each of said n buffers comprising:
        at least one inverter;
        an input stage for supplying a clock signal to said at least one inverter;
        an output stage, for outputting the clock signal from said at least one inverter, said output stage connected in series to an input stage of a next one of said hierarchical stages; and
        a short circuit wire connecting said output stage at each hierarchical level.

7. A clock signal distribution circuit having a tree structure as recited in claim 6, wherein each of said n buffers in each of said plurality of hierarchical stages comprises an input stage inverter and an output stage inverter, said output stage inverter being larger in size than said input stage inverter.

8. A clock signal distribution circuit having a tree structure as recited in claim 6, wherein said at least one inverter comprises a PMOS transistor connected in series with an NMOS transistor.

9. A reduced skew H-tree clock signal distribution circuit having a plurality of hierarchical stages, comprising:

a first stage comprising a buffer, said buffer comprising an input for receiving a clock signal and an output for outputting the clock signal;

wiring connected to said output of said first stage, said wiring arranged in an H-tree pattern having four connection points;

a second stage, connected to one of said four connection points, said second stage comprising four buffers each comprising and input stage for receiving the clock signal from said first stage, and an output for outputting the clock signal; and a short-circuit wire electrically connecting together the output of each of said buffers of said second stage.

10. A reduced skew H-tree clock signal distribution circuit as recited in claim 9 wherein said buffers comprise:

first and second inverters connected in series, said first inverter for receiving the clock signal at an input and said second inverter for outputting the clock signal said second inverter being larger than said first inverter.

11. A reduced skew H-tree clock signal distribution circuit as recited in claim 10 wherein said first and said second inverters each comprise a PMOS transistor connected in series with an NMOS transistor.

\* \* \* \* \*